(12) United States Patent
Kaulmann et al.

(10) Patent No.: US 12,316,254 B2
(45) Date of Patent: May 27, 2025

(54) STATOR MODULE FOR A LINEAR TRANSPORT SYSTEM

(71) Applicant: Beckhoff Automation GmbH, Verl (DE)

(72) Inventors: Tim Kaulmann, Paderborn (DE); Dirk Otterpohl, Rietberg (DE); Marc Hegselmann, Schloss Holte Stukenbrock (DE)

(73) Assignee: Beckhoff Automation GmbH, Verl (DE)

( * ) Notice: Subject to any disclaimer, the term of this patent is extended or adjusted under 35 U.S.C. 154(b) by 151 days.

(21) Appl. No.: 18/177,845

(22) Filed: Mar. 3, 2023

(65) Prior Publication Data

US 2023/0208335 A1    Jun. 29, 2023

Related U.S. Application Data

(63) Continuation of application No. PCT/EP2021/076583, filed on Sep. 28, 2021.

(30) Foreign Application Priority Data

Sep. 29, 2020    (DE) ..................... 10 2020 125 396.6

(51) Int. Cl.
*H02M 7/5395*    (2006.01)
*H02P 25/064*    (2016.01)

(52) U.S. Cl.
CPC ................. *H02P 25/064* (2016.02)

(58) Field of Classification Search
CPC ...... H02P 25/064; H02P 1/163; H02M 7/5395
See application file for complete search history.

(56) References Cited

U.S. PATENT DOCUMENTS 3,934,184 A    1/1976    Bonig et al.
6,191,507 B1    2/2001    Peltier et al.
(Continued)

FOREIGN PATENT DOCUMENTS

DE    2239897 C2    8/1984
DE    3814867 A1    11/1989
(Continued)

OTHER PUBLICATIONS

International Search Report and Written Opinion dated Jan. 21, 2022 in connection with International Patent Application No. PCT/EP2021/076583, 14 pages including English translation.
(Continued)

*Primary Examiner* — Cortez M Cook
(74) *Attorney, Agent, or Firm* — Dorsey & Whitney LLP

(57) ABSTRACT

A stator module of a linear transport system includes a plurality of drive coils, which are energizable and form part of a stator of a linear motor. The stator module also includes actuation electronics, where the drive coils are actuatable by the actuation electronics. The actuation electronics includes at least an actuation element, which is arranged to energize a number of drive coils. The actuation element has a number of half bridges, each comprising a first half-bridge connection, a second half-bridge connection, and a half-bridge center. The first half-bridge connections of the half bridges are connected to one another, and the second half-bridge connections of the half bridges are connected to one another. The half bridges and the drive coils form a chain, with the half-bridge centers and drive coils arranged alternately within the chain, at least one half-bridge center being connected to two drive coils.

15 Claims, 15 Drawing Sheets

(56) References Cited

U.S. PATENT DOCUMENTS

| | | | |
|---|---|---|---|
| 6,411,049 | B1 | 6/2002 | Fischperer |
| 9,806,647 | B2 | 10/2017 | Prüssmeier et al. |
| 10,164,555 | B1* | 12/2018 | Ozimek .............. H02M 7/5395 |
| 10,250,176 | B2 | 4/2019 | Faschang et al. |
| 10,256,023 | B2 | 4/2019 | Ozimek et al. |
| 10,507,925 | B2 | 12/2019 | Pugliesi et al. |
| 10,824,130 | B2* | 11/2020 | Raja ....................... G05B 19/40 |
| 10,978,969 | B2 | 4/2021 | Weber et al. |
| 2016/0072413 | A1* | 3/2016 | Grasblum ............... H02P 1/163 |
| | | | 318/254.1 |
| 2016/0241173 | A1 | 8/2016 | Prüssmeier et al. |
| 2017/0346434 | A1 | 11/2017 | Faschang et al. |
| 2019/0229668 | A1* | 7/2019 | Jiang ....................... H02K 1/00 |

FOREIGN PATENT DOCUMENTS

| | | | |
|---|---|---|---|
| DE | 282579 | A7 | 9/1990 |
| DE | 4236340 | C2 | 11/1994 |
| DE | 19922441 | A1 | 11/2000 |
| DE | 69836988 | T2 | 3/2007 |
| DE | 102015102236 | A1 | 8/2016 |
| EP | 3249803 | A1 | 11/2017 |
| EP | 3461667 | A1 | 4/2019 |
| EP | 3581428 | A1 | 12/2019 |
| JP | S641466 | A | 1/1989 |
| WO | 2018029989 | A1 | 2/2018 |

OTHER PUBLICATIONS

Office Action dated Jun. 23, 2021 in connection with German patent application No. 10 2020 125 396.6, 8 pages including English translation.

Li, An et al. "Five-phase Series-end Winding Motor Controller: Converter Topology and Modulation Method," Huazhong University of Science and Technology, 2019 IEEE Energy Conversion Congress and Exposition, Sep. 29, 2019.

International Preliminary Report on Patentability dated Dec. 20, 2022 in connection with International Patent Application No. PCT/EP2021/076583, 25 pages including English translation.

* cited by examiner

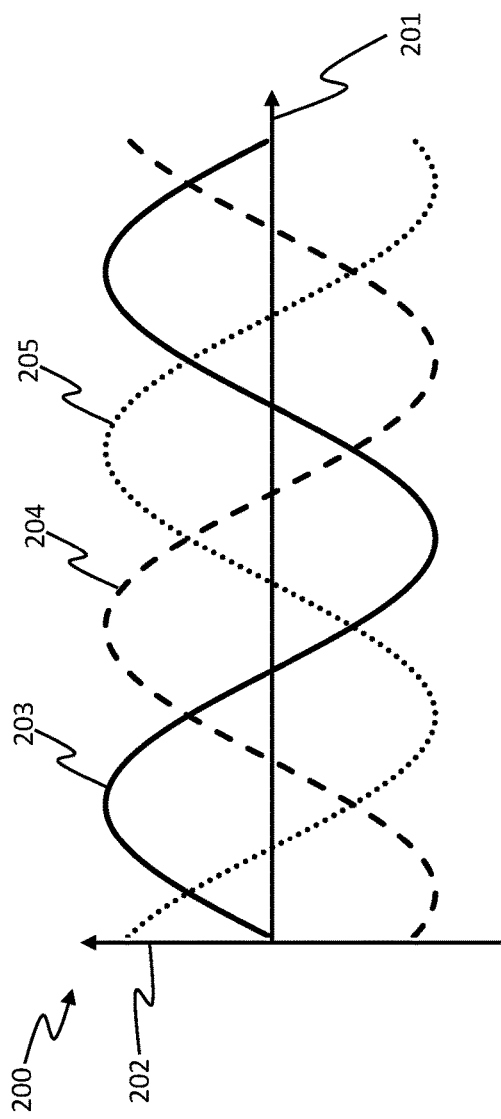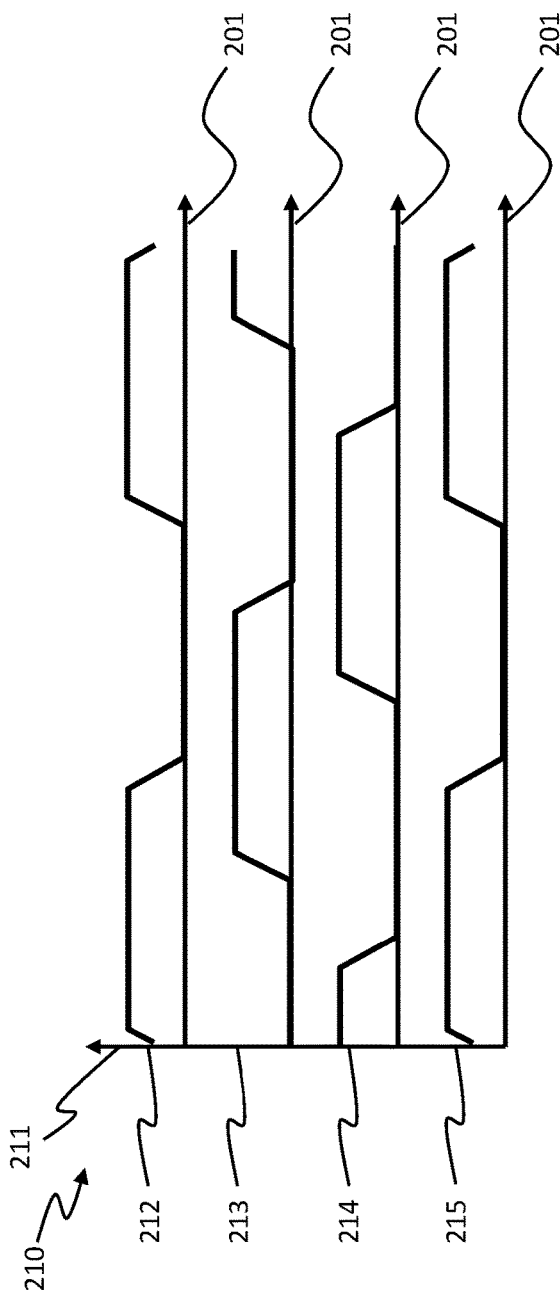
Fig. 10A
Fig. 10B

STATOR MODULE FOR A LINEAR TRANSPORT SYSTEM

CROSS-REFERENCE TO RELATED APPLICATIONS

This patent application is a continuation of International Patent Application No. PCT/EP2021/076583, filed Sep. 28, 2021, titled "Stator Module for a Linear Transport System," which claims the priority of German patent application DE 10 2020 125 396.6, filed Sep. 29, 2020, titled "Statormodul für ein lineares Transportsystem," each of which are incorporated by reference herein, in the entirety and for all purposes.

FIELD

The invention relates to a stator module for a linear transport system, as well as to a linear transport system comprising such a stator module and an operating method for such a stator module.

From the prior art, linear transport systems are known which comprise stator modules, wherein the stator modules form a stator of a linear motor and each comprise a plurality of drive coils, wherein the linear transport system further comprises a movable slide, wherein a permanent magnet assembly is arranged on the slide and forms a slide of the linear motor. In this regard, the drive coils may be energized with the aid of full bridges. A half bridge consisting of two transistors is then arranged at the two connections of each drive coil, so that the drive coil may be energized depending on the switching state of the transistors. However, this embodiment is very complex, since four transistors are required for each drive coil. The half bridges may also have other switching elements or special transistors such as MOSFETs, IGBTs or HEMTs.

The manner in which the drive coils may be energized in general may be found in DE 10 2015 102 236 A1 and is in this publication in particular described in connection with FIGS. 6 to 14.

EP 3 249 803 A1 proposes to connect each drive coil with only one half bridge and to connect the respective free connection of the drive coils with one another, thus providing a star circuit. In this way, two transistors may be saved per drive coil. The publications U.S. Pat. No. 10,256,023 B2, EP 3 461 667 A1, U.S. Pat. Nos. 10,164,555 B1 and 10,250,176 B2 also propose such a star circuit.

However, this embodiment using a star circuit has the disadvantage that complex electronics are required at the star point if the drive coils are arranged with the aid of the star circuit disclosed in the publications mentioned.

SUMMARY

The present invention provides actuation electronics for drive coils in a stator module, which, compared to full bridges, also provides the possibility of saving transistors, but which does not require complex electronics for a star point, either.

According to a first aspect, a stator module of a linear transport system comprises a plurality of drive coils, wherein the drive coils may be energized and form part of a stator of a linear motor. The stator module further comprises actuation electronics, wherein the drive coils may be controlled by the actuation electronics. The actuation electronics comprise at least one actuation element, wherein the actuation element is arranged to energize a number of drive coils. The actuation element comprises a number of half bridges. The half bridges each comprise a first half-bridge connection, a second half-bridge connection, and a half-bridge center, wherein the first half-bridge connections of the half bridges are connected to one another, and wherein the second half-bridge connections of the half bridges are connected to one another. The half bridges and the drive coils form a chain, wherein half-bridge centers and drive coils are alternately disposed within the chain. At least one half-bridge center point is (directly) connected to two drive coils.

The arrangement within the chain and the fact that a half-bridge center point is connected to two drive coils saves half bridges compared to actuating the drive coils with the aid of full bridges. On the other hand, no star point exists so that electronics to be connected there may be omitted. Thus, the arrangement of half bridges and drive coils in the chain advantageously allows for a more cost-saving production of the stator module.

In an embodiment of the stator module, the number of half bridges is larger by one than the number of drive coils. This is an open chain that allows for simple actuation.

According to a second aspect, a linear transport system comprises at least one of the described stator modules and at least one slide.

According to a third aspect, a method for operating a stator module of a linear transport system is provided, in which drive coils of the stator module are actuated with the aid of half bridges and the actuation of the half bridges takes into account that at least one half bridge is connected to two drive coils.

EXAMPLES

In an embodiment of the stator module, an initial center of an initial half bridge is connected to a first drive coil, wherein the first drive coil is connected to an intermediate center of an intermediate half bridge. An end center of an end half bridge is connected to a second drive coil, the second drive coil being connected to an intermediate center of an intermediate half bridge. Third drive coils are connected to the intermediate half bridges and possibly to further intermediate half bridges in accordance with the number of drive coils. Depending on the number of drive coils, a plurality of intermediate half bridges may be provided. The number of intermediate half bridges may be one less than the number of drive coils.

In an embodiment of the stator module, the number of half bridges is identical to the number of drive coils. This represents a closed chain, which may correspond to a delta circuit if three drive coils are provided.

In an embodiment of the stator module, an initial center of an initial half bridge is connected to a first drive coil, wherein the first drive coil is connected to an intermediate center of an intermediate half bridge. The initial center of the initial half bridge is connected to a second drive coil, wherein the second drive coil is connected to an intermediate center of an intermediate half bridge. Third drive coils according to the number of drive coils are connected to the intermediate half bridges and, as the case may be, to further intermediate half bridges.

In an embodiment of the stator module, the number of drive coils equals three. This makes it possible to save one third of the half bridges in the case of the open chain compared to the actuation via full bridges and of half of the half bridges in the case of the closed chain compared to the actuation via full bridges.

In an embodiment of the stator module, the three drive coils that may be actuated by the actuation unit form a three-phase system. Such a three-phase system may easily be actuated and allows for operating the linear motor as a three-phase motor.

In an embodiment, the stator module further comprises a communication input, wherein the stator module is set up to receive data concerning actuation of the drive coils via the communication input and to switch the half bridges of the actuation element according to the data. The data relating to actuation of the drive coils may also comprises data relating to the movement of a slide.

In an embodiment, the stator module further comprises a control regulator, wherein the control regulator is set up to determine actual current values of the drive coils and to switch the half bridges of the actuation element on the basis of the actual current values. In this way, improved actuation may be achieved.

In an embodiment, the stator module further comprises current meters for determining the actual current values, wherein the current meters are arranged within the half bridges and/or in series with the drive coils.

In an embodiment of the stator module, the switching of the half bridges is performed using pulse-width modulation.

In an embodiment, the stator module further comprises a limiting controller, wherein the data comprise current setpoints or voltage setpoints for the drive coils. The limiting controller is configured to change the current setpoints or voltage setpoints such that a sum of voltages of the drive coils of an actuation element does not exceed a maximum voltage.

In an embodiment of the stator module, the limiting controller is arranged to calculate a cumulative sum over a time curve of the voltage to be applied to the drive coils of an actuation element and to determine a maximum value and a minimum value of the cumulative sum. The limiting controller is furthermore set up to check whether a difference between the maximum value and the minimum value exceeds a design voltage, and in the event that the difference exceeds the design voltage, to reduce the voltage setpoints in such a way that the difference no longer exceeds the design voltage when the calculation steps are repeated.

In an embodiment, the linear transport system further comprises at least one controller, wherein the controller is arranged to pass data to a communication input of the stator module via a communication output, wherein the data comprises current setpoints or voltage setpoints for the drive coils of the stator module.

In an embodiment of the linear transport system, the controller has a limiter. The limiter is set up to change the current setpoints or voltage setpoints in such a way that a sum of voltages of the drive coils of an actuation element does not exceed a maximum voltage.

In an embodiment of the linear transport system, the limiter is arranged to calculate a cumulative sum over a time curve of the voltage to be applied to the drive coils of an actuation element, to determine a maximum value and a minimum value of the cumulative sum. The limiter is also set up to check whether a difference between the maximum value and the minimum value exceeds a design voltage, and in the event that the difference exceeds the design voltage, to reduce the voltage setpoints in such a way that the difference no longer exceeds the design voltage when the calculation steps are run through again.

In an embodiment of the method, the stator module receives data with current setpoints or voltage setpoints for the drive coils. Furthermore, the stator module changes the current setpoints or voltage setpoints such that a sum of voltages of the drive coils of an actuation element does not exceed a maximum voltage.

In an embodiment of the method, the stator module calculates a cumulative sum over a time curve of the voltage to be applied to the drive coils of an actuation element and a maximum value and a minimum value of the cumulative sum. Furthermore, the stator module checks whether a difference between the maximum value and the minimum value exceeds a design voltage, and in the event that the difference exceeds the design voltage, the stator module reduces the voltage setpoints such that when the calculation steps are repeated, the difference no longer exceeds the design voltage.

BRIEF DESCRIPTION OF THE DRAWINGS

The invention will be discussed in more detail below by embodiment examples and with reference to figures. Here, in a schematic illustration in each case:

FIGS. 10A and 10B show actuation of the drive coils without necessary limitation;

DETAILED DESCRIPTION

Figure 1:
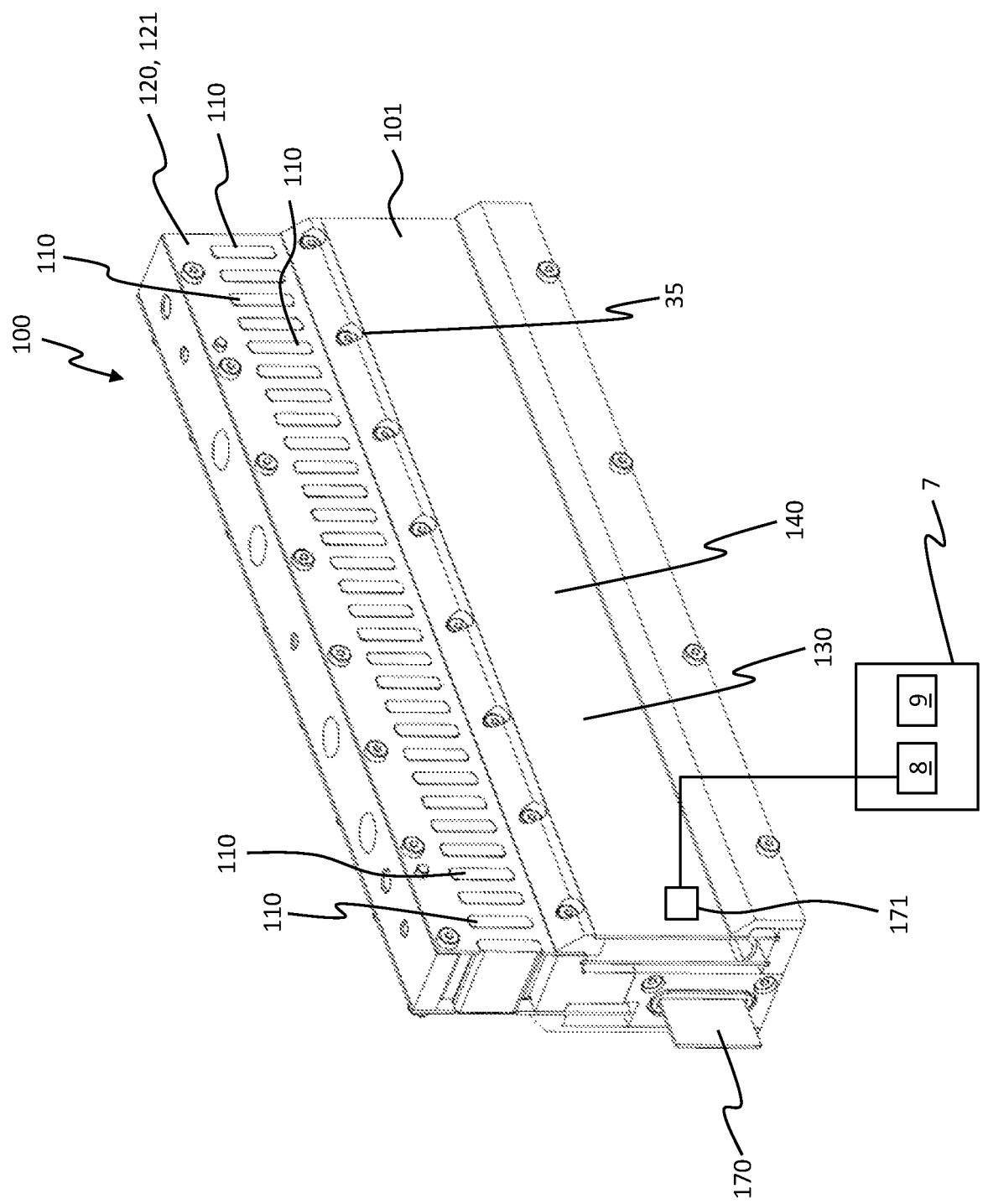
FIG. 1 shows a stator module of a linear transport system.

FIG. 1 shows a view of a stator module 100 for a linear transport system. The stator module 100 comprises drive coils 110 that form part of a stator 121 of a linear motor 120. The stator module 100 further comprises a housing 101. An actuation electronics 130 is arranged within the housing 101. The actuation electronics 130 comprises at least one actuation element 140.

Furthermore, an optional communication input 171 is arranged on the stator module 100, which is connected to a communication output 8 of a controller 7. In addition, the stator module 100 has a module connection 170, which may be used to set up a communication bus to a further stator module. Connected to the controller 7 via the module connection 170, the communication input 171 and the communication output 8.

Figure 2:
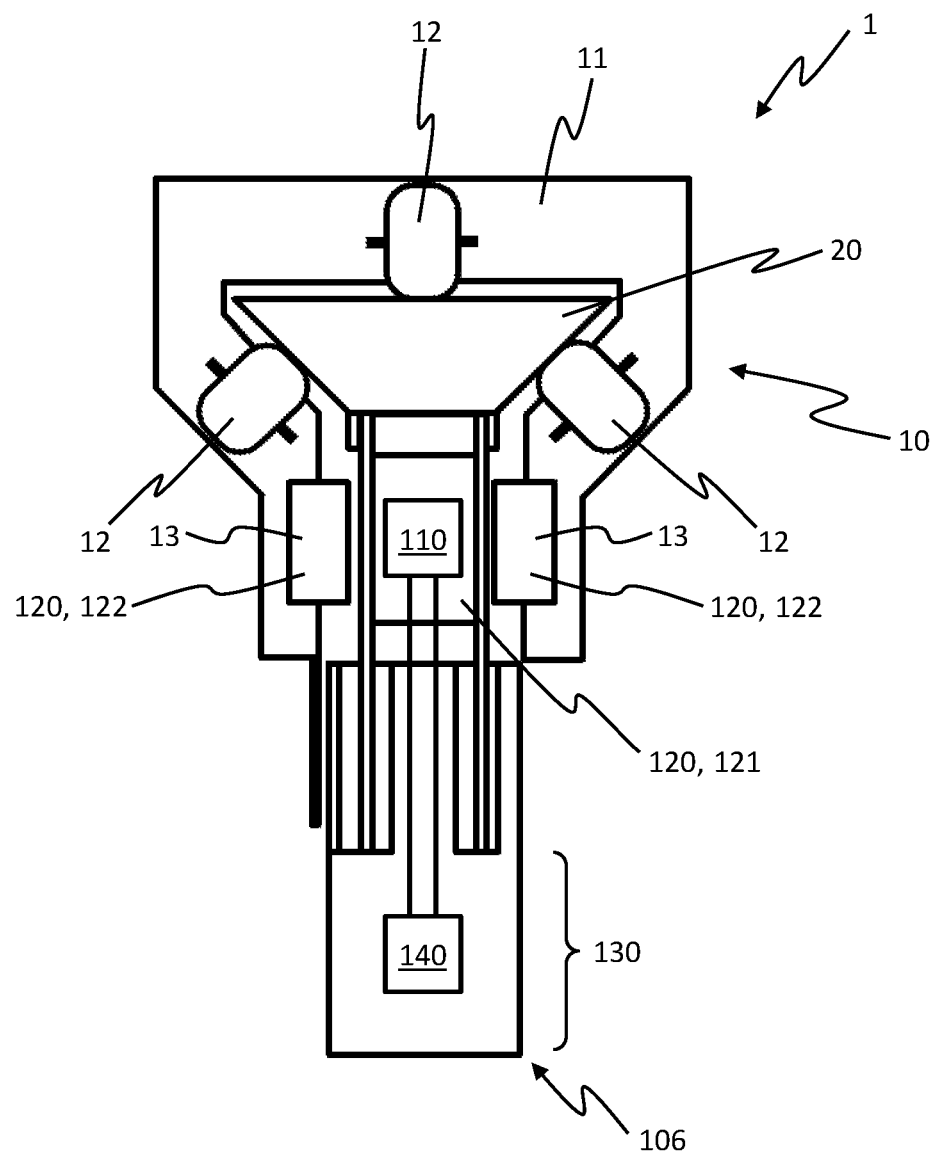
FIG. 2 shows a cross-sectional view of a linear transport system.

FIG. 2 shows a cross-sectional view of a linear transport system 1. The stator module 100 is embodied as shown in FIG. 1. Furthermore, a guide rail 20 is shown which may be part of the stator module 100 when attached to the stator module 100. A slide 10 is movably arranged on the guide rail 20 and may be moved along the stator module 100. The slide 10 comprises a frame 11 and rollers 12 arranged at the frame 11 that may roll off on the guide rail 20. A permanent magnet assembly 13 is further arranged at the frame 11 of the slide 10, said magnet assembly 13 forming a rotor 122 of the linear motor 120. If necessary, a plurality of stator modules 100 may be arranged in a row to form, together with the associated guide rails, a circulating track for the slide 10. Furthermore, more than one slide 10 may be provided.

The drive coil 110 shown in FIG. 2 is connected to an actuation element 140 of the actuation electronics 130, the actuation element 140 being part of the actuation electronics 130. The drive coil 100 may also be understood to be part of the actuation element 140 or may be arranged outside of the actuation element 140.

Via the actuation element 140, a number of drive coils 110 may be energized, wherein, as the case may be, a plurality of actuation elements 140 are provided in the stator module 100 in order to energize all drive coils 110 of the stator module 100. All actuation elements 140 are part of the actuation electronics 130 and serve to actuate the drive coils 110.

Figure 3:
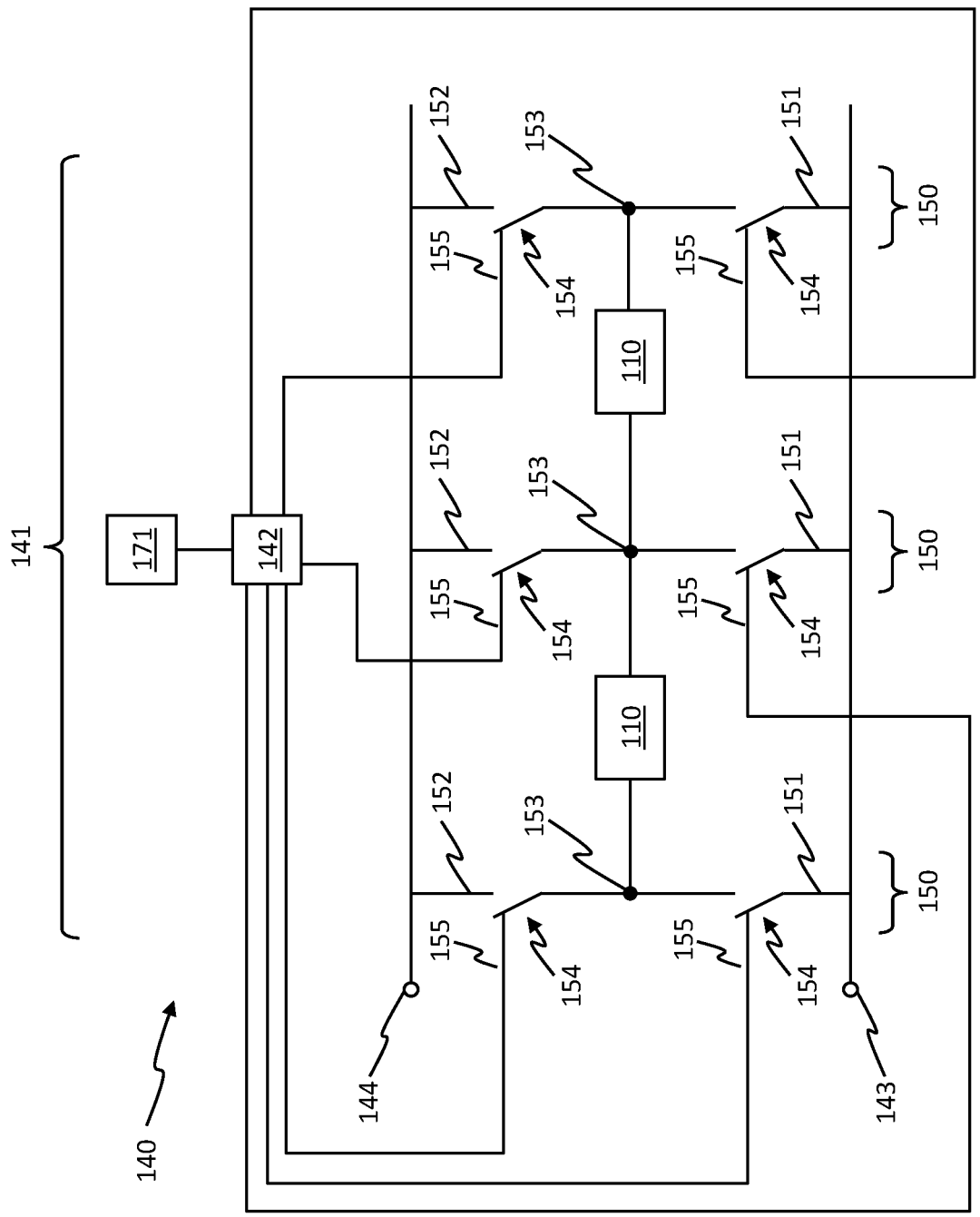
FIG. 3 shows an actuation element of an actuation electronics.

FIG. 3 shows an electrical circuit of an actuation element 140. The actuation element 140 is arranged to energize a number of drive coils 110 and comprises a number of half bridges 150, wherein three half bridges 150 and two drive coils 110 are shown in the embodiment example of FIG. 3. The half bridges 150 each comprise a first half-bridge connection 151, a second half-bridge connection 152, and a half-bridge center 153. The first half-bridge connections 151 of the half bridges 150 are connected to one another. The second half-bridge connections 152 of the half bridges 150 are connected to one another. The half bridges 150 and the drive coils 110 form a chain 141, wherein half-bridge centers 153 and drive coils 110 are alternately arranged within the chain 141. At least one half-bridge center 153 (the half-bridge center between the drive coils 110) is connected to two drive coils 110.

The first half-bridge connections 151 are connected to a first voltage input 143. The second half-bridge connections 152 are connected to a second voltage input 144. A DC voltage of e.g. 48 volts may be applied between the first voltage input 143 and the second voltage input 144.

The half bridges 150 each comprise a switch 154 between the first half-bridge connection 151 and the half-bridge center 153 and between the second half-bridge connection 152 and the half-bridge center 153, each switch 154 having a switch input 155. The switches 154 are switchable by a signal, e.g. a voltage, applied to the switch input 155. This means that the switches 154 are closed or open depending on the signal provided via the switch input 155. In this context, the switches 154 may be embodied as transistors and, in particular, as MOSFETs. Alternatively, the switches 154 may be embodied as IGBTs or HEMTs.

The switch inputs 155 are connected to a control 142, wherein signals may be output by the control 142 via which the switches 154 may be opened or closed. This allows for predetermined voltage curves to be applied to the drive coils 110, with the switches 154 being closed or opened using pulse-width modulation, as the case may be. The control 142 may be connected to the communication input 171, as shown in FIG. 3.

In contrast to actuating the drive coils 110 with the aid of full bridges, the actuation element 140 shown in FIG. 3 may save a half bridge 150 when actuating two drive coils 110. Thus, only three quarters of the half bridges 150 would be required in total compared to actuate with the aid of full bridges, thus reducing the production costs of the stator module 100. Further actuation elements 140 shown below provide for other numbers of half bridges 150 and/or drive coils 110, wherein at least one half-bridge center 153 is always connected to two drive coils 110 and the drive coils are connected in series.

The half bridges 150 may also be embodied as a multi-level circuit so that, for example, more than one switch 154 is arranged between the first half-bridge connection 151 and the half-bridge center 153 and between the second half-bridge connection 152 and the half-bridge center 153, respectively. This allows for the switched voltage to be stepped. In this context, switching may e.g. be performed first to 24 volts and then to 48 volts, so that excessive voltage jumps may be avoided, and the components may be embodied more cost-effectively.

Figure 4:
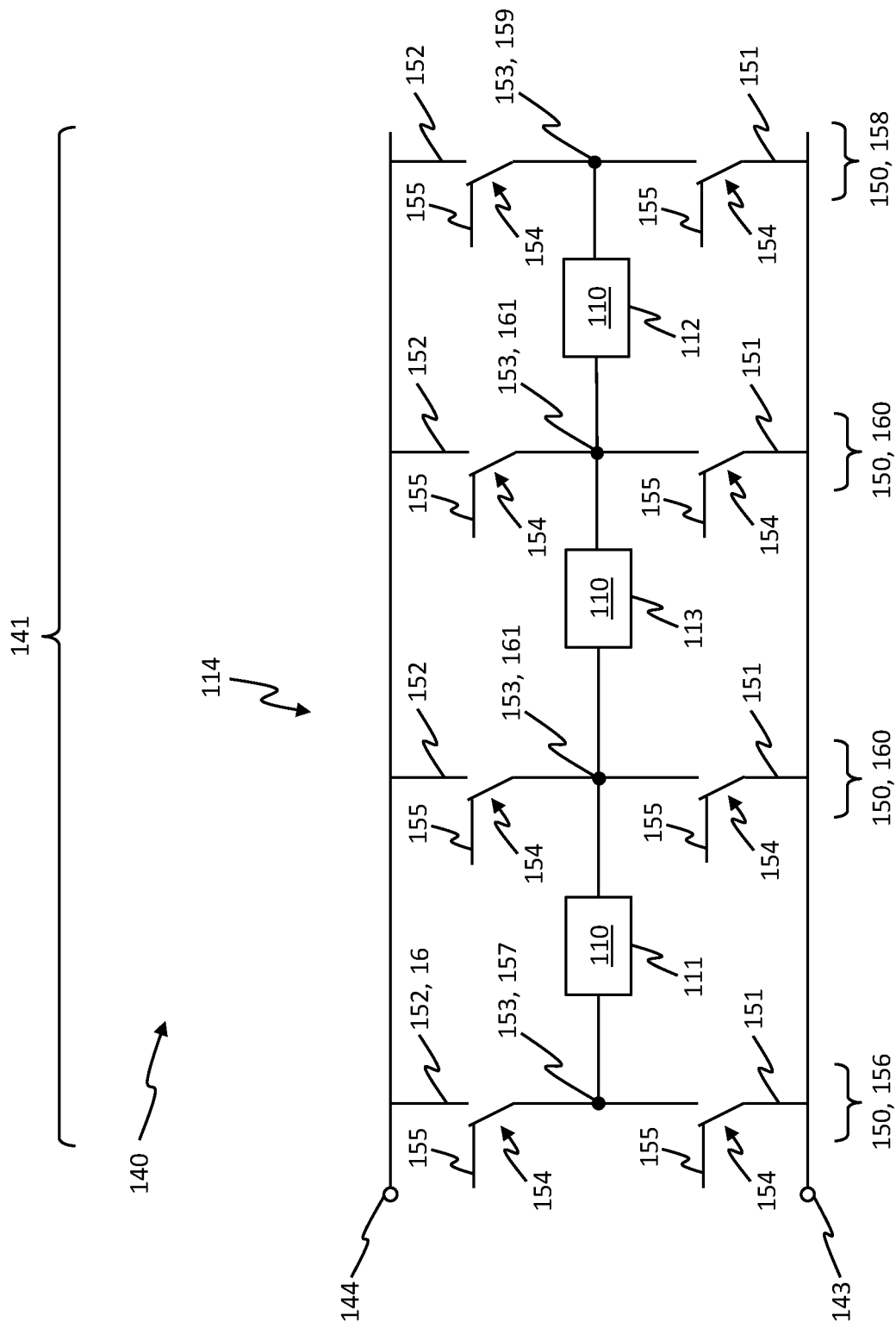
FIG. 4 shows a further actuation element of an actuation electronics.

FIG. 4 shows an electrical circuit of a further actuation element 140 corresponding to the actuation element 140 of FIG. 3, unless differences are described below. For clarity, the control 142 and the communication input 171 may be provided.

The actuation element 140 comprises four half bridges 150 and three drive coils 110, so the chain 141 has been extended by one half bridge 150 and one drive coil 110 each. This may in principle be repeated so that the number of half bridges 150 is always larger by one compared to the number of drive coils 110. The chain 141 is in this context an open chain.

An initial center 157 of an initial half bridge 156 is connected to a first drive coil 111. The first drive coil 111 is connected to an intermediate center 161 of an intermediate half bridge 160. An end center 159 of an end half bridge 158 is connected to a second drive coil 112. The second drive coil 112 is connected to an intermediate center 161 of an intermediate half bridge 160. A third drive coil 113 is connected to two intermediate centers 161. More than three drive coils 110 may also be provided. In this case, further third drive coils 113 are connected to the intermediate half bridges 160 and, as the case may be, further intermediate half bridges 160 in accordance with the number of drive coils 110.

In contrast to actuating the drive coils 110 via full bridges, the actuation element 140 shown in FIG. 4 may save two half bridges 150 when actuating three drive coils 110. Thus, only two-thirds of the half bridges 150 would be required in total compared to actuation via full bridges, thus reducing the production costs of the stator module 100. If additional drive coils 110 are added to the chain 141, further savings in half bridges 150 may be made. However, since the actuation becomes increasingly complex with the number of drive coils 110 in an actuation element 140, the actuation element 140 shown in FIG. 4 represents a good compromise in terms of cost savings and complexity of the actuation.

Figure 5:
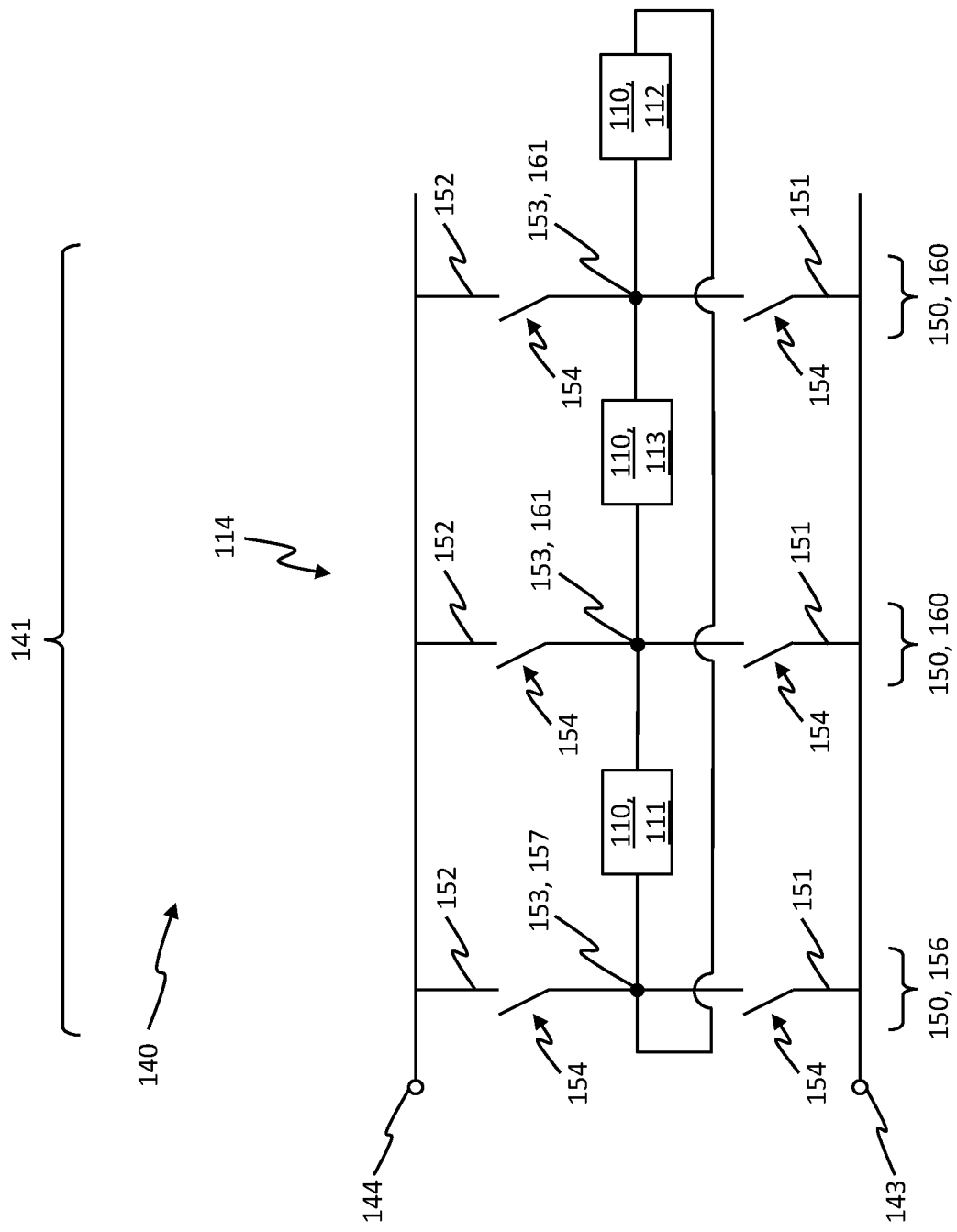
FIG. 5 shows a further actuation element of an actuation electronics.

FIG. 5 shows an electrical circuit of a further actuation element 140 corresponding to the actuation element 140 of FIG. 3, unless differences are described below. For clarity, the control 142 and the communication input 171 may also be provided.

The actuation element 140 comprises three half bridges 150 and three drive coils 110, so the chain 141 has been extended by one drive coil 110. This may in principle be repeated so that the number of half bridges 150 is always identical to the number of drive coils 110. The chain 141 is in this context a closed chain.

An initial center 157 of an initial half bridge 156 is connected to a first drive coil 111. The first drive coil 111 is connected to an intermediate center 161 of an intermediate half bridge 160. A second drive coil 112 is also connected to the initial center 157. The second drive coil 112 is also connected to an intermediate center 161 of an intermediate half bridge 160. A third drive coil 113 is connected to two intermediate centers 161. More than three drive coils 110 may be provided, as well. In this case, further third drive coils 113 are connected to intermediate half bridges 160 and, as the case may be, further intermediate half bridges 160 in accordance with the number of drive coils 110. In this embodiment example, the drive coils 110 form a delta circuit.

In an embodiment example, the three drive coils 110 form a three-phase system 114. In particular, the actuation elements 140 shown in FIGS. 4 and 5 comprise a three-phase system 114.

In an embodiment example, the stator module 100 comprises the communication input 171, wherein the stator module 100 is configured to receive data regarding the actuation of the drive coils 110 via the communication input 171 and to switch the half bridges 150 of the actuation element 140 according to the data. In particular, the control 142 may be configured to perform this method.

In contrast to actuating the drive coils 110 via full bridges, the actuation element 140 shown in FIG. 5 may save three half bridges 150 when actuating three drive coils 110. For each additional drive coil 110, another half bridge 150 may be saved. Thus, only half of the half bridges 150 would be required in total compared to actuation via full bridges, thereby reducing the production cost of the stator module 100. However, since actuation becomes increasingly complex with the number of drive coils 110 in an actuation element 140, the actuation element 140 shown in FIG. 5 also represents a good compromise in terms of cost savings and complexity of the actuation.

Figure 6:
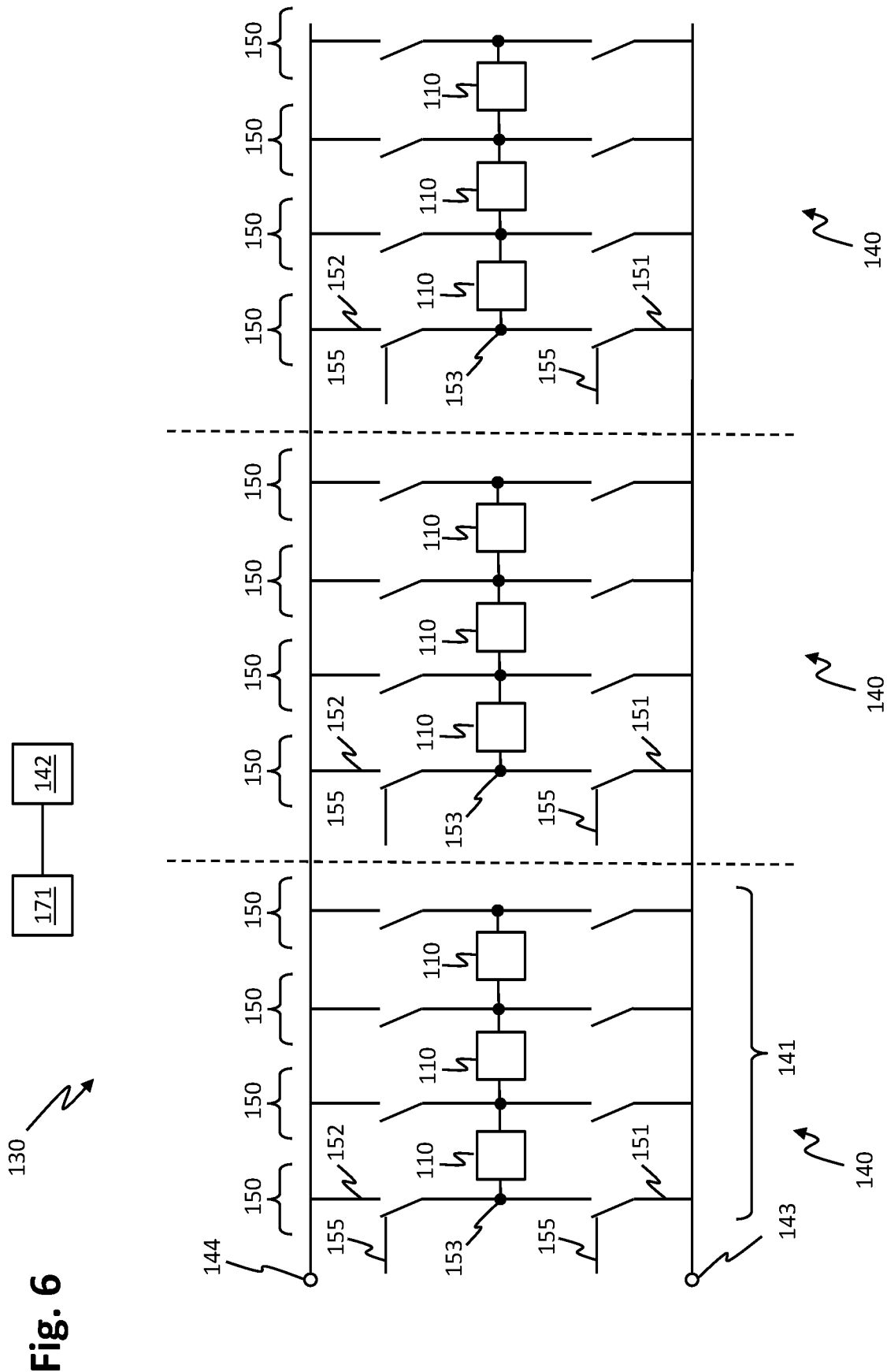
FIG. 6 shows an actuation electronics.

FIG. 6 shows an electrical circuit of an actuation electronics 130. For clarity, the connections of the switch inputs 155 to the control 142 may also be provided. The actuation electronics 130 comprise three switching elements 140, each of which is configured like the switching element 140 of FIG. 4. Alternatively, other embodiments may be provided, e.g. as shown in FIG. 3 or 5. In principle, the number of connection units 140 and the number of drive coils 110 per connection unit 140 may be dimensioned in such a way that, in an arrangement corresponding to FIG. 6, all drive coils 110 of the stator module may be actuated with the aid of the actuation electronics 130. For example, the stator module may comprise 75 drive coils 110 and 25 connection elements 140.

In this case, the first half-bridge connections 151 of all connection elements 140 are connected to one another and to the first voltage input 143, while the second half-bridge connections 152 of all connection elements 140 are connected to one another and to the second voltage input 144.

Figure 7:
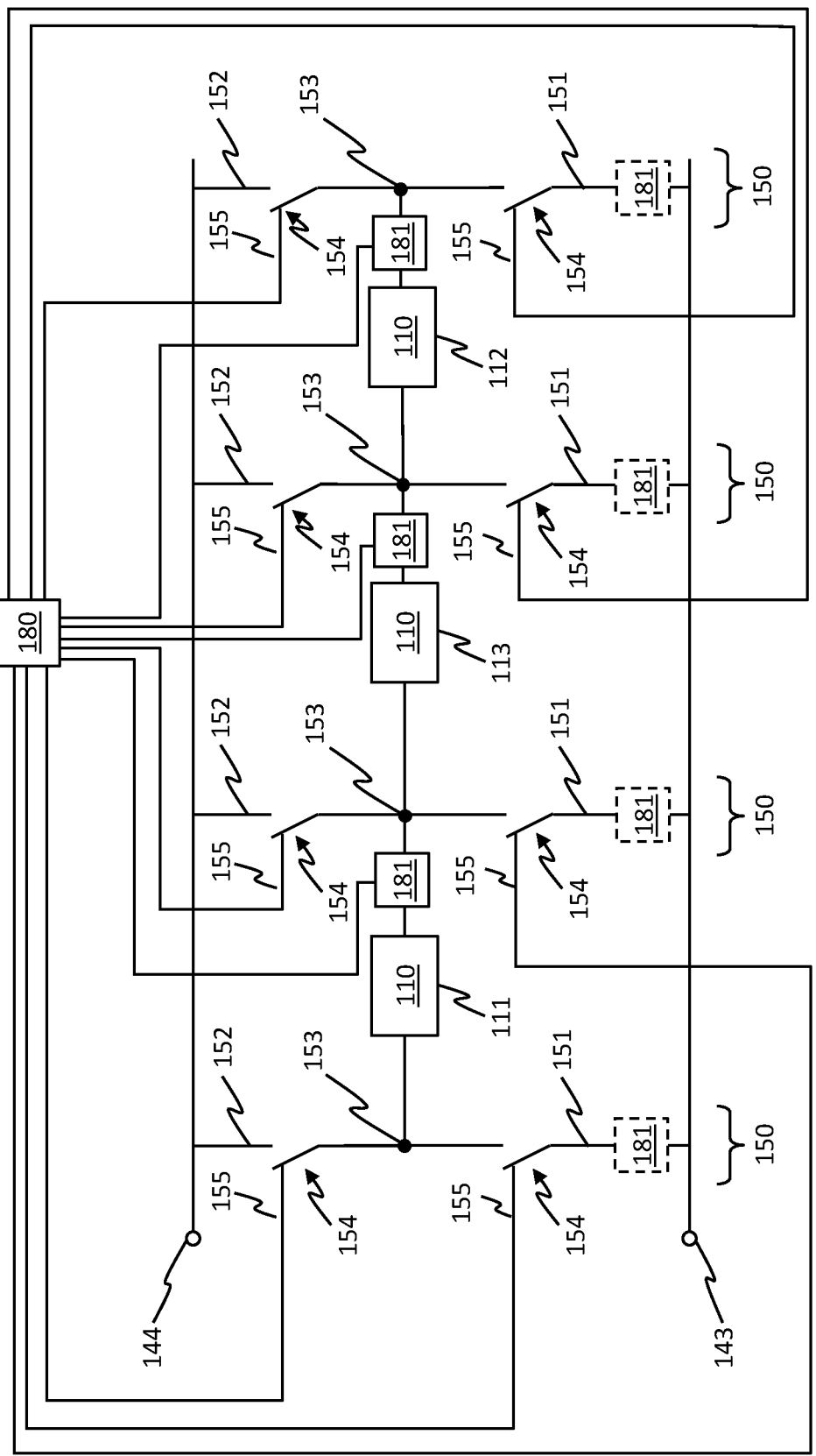
FIG. 7 shows a further actuation element of an actuation electronics.

FIG. 7 shows a further actuation element 140, which corresponds to the actuation element 140 of FIG. 4, unless differences are described below. The control 142 is not directly connected to the switch inputs 155, but via a control regulator 180. The control regulator is connected to current meters 181, each of which is connected in series with the drive coils 110. Alternatively, the current meters 181 may also be arranged within the half bridges 150. This is also shown in dashed form also in FIG. 7. In this case, the current meters 181 shown in dashed lines are arranged at the first half-bridge connections 151. Alternatively, the current meters 181 may also be arranged at the second half-bridge connections 152. The control regulator 180 is arranged to determine actual current values of the drive coils 110 and to switch the half bridges 150 of the actuation element 140 based on the actual current values. In an embodiment, no current meters 181 are provided and the actual current values are determined otherwise, e.g. via current measurements at the first voltage input 143 and the second voltage input 144, respectively.

Figure 8:
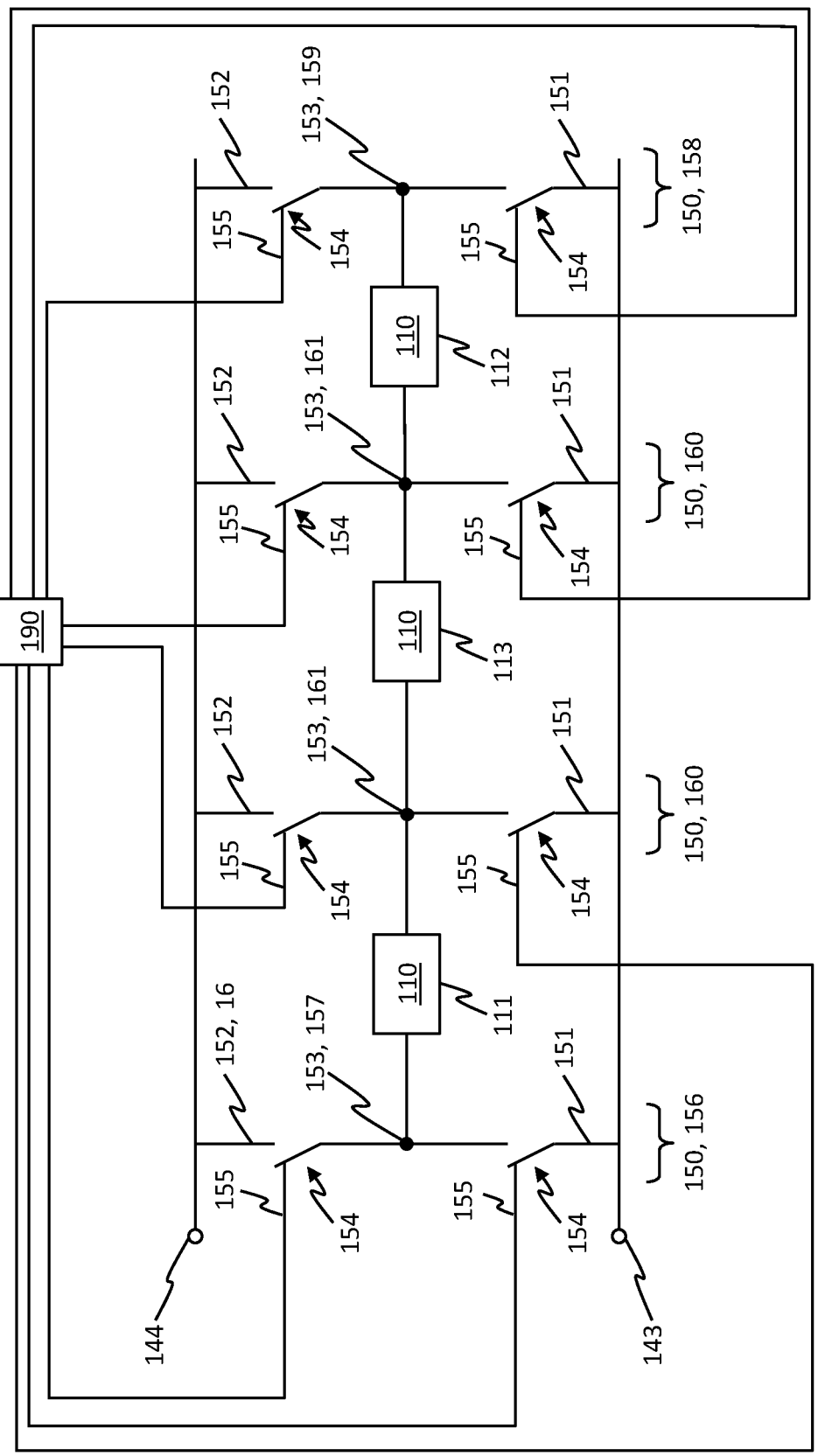
FIG. 8 shows a further actuation element of an actuation electronics.

FIG. 8 shows another actuation element 140 which corresponds to the actuation element 140 of FIG. 4, unless differences are described in the following. The control 142 is not directly connected to the switch inputs 155, but via a limiting controller 190. The limiting controller 190 is set up to change the current setpoints or voltage setpoints in such a way that a sum of voltages of the drive coils 110 of an actuation element 140 does not exceed a maximum voltage. For this purpose, it may be provided, as shown and described in connection with FIG. 7, to determine actual current values with the aid of current meters 181 and to provide a control via a control regulator 180, wherein the control regulator 180 may be part of the limiting controller 190 or may be arranged upstream or downstream of the limiting controller 190.

Figure 9:
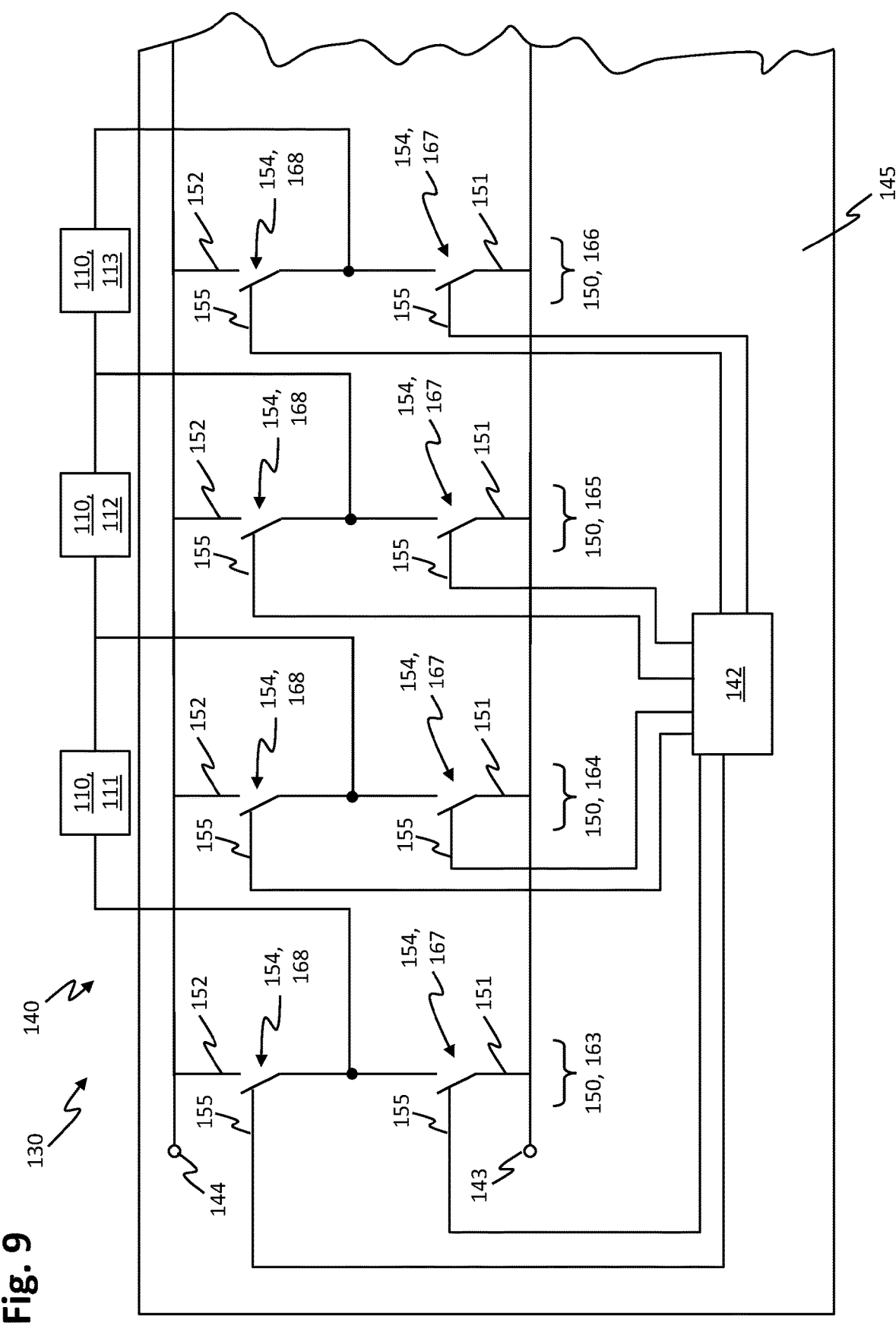
FIG. 9 shows a further actuation element of an actuation electronics.

FIG. 9 shows an actuation element 140 of an actuation electronics 130. The actuation element 140 corresponds to the actuation element of FIG. 4, unless differences are described in the following. The drive coils 110 are not part of the actuation element 140, but are arranged externally and connected with the aid of lines. For example, the actuation element 140 may be arranged on a circuit board 145, with plug-in connections or other connections for the drive coils 110 being provided on the circuit board.

A control 142 is again connected to the switch inputs 155 of the half bridges 150. A first drive coil 111 is arranged between a first half bridge 163 and a second half bridge 164. A second drive coil 112 is arranged between a second half bridge 164 and a third half bridge 165. A third drive coil 113 is arranged between a third half bridge 165 and a fourth half bridge 166. The switches 154 facing the first half-bridge connections 151 may also be construed as first switches 167. The respective other switches 154 may be understood as second switches 168. The numbering of the drive coils 110 differs here from the numbering in FIG. 4. The numbering selected in FIG. 9 also applies to the following explanations regarding the limiting controllers, which are explained in connection with the following figures.

FIG. 10A shows a first diagram 200 shows which voltage curves to be applied for the voltages applied to the drive coils 110. In this context, the first diagram 200 has a time axis 201 and a voltage axis 202. A first voltage curve 203 to be applied corresponds to the voltage to be applied to the first drive coil 111. A second voltage curve 204 to be applied corresponds to the voltage to be applied to the second drive coil 112. A third voltage curve 205 to be applied corresponds to the voltage to be applied to the third drive coil 113. The first, second, and third voltage curves 203, 204, 205, respectively, are each sinusoidal and 120 degrees out of phase, resulting in a classic three-phase system 114. As the case may be, the first, second and third voltage curves 203, 204, 205 may also have a different phase relationship.

FIG. 10B additionally shows a second diagram 210 in which switching time curves of the switching signals applied to the first switches 167 of the half bridges 150 of FIG. 9 are depicted. The diagram also has a time axis 201 and a signal axis 211. A first switching time curve 212 corresponds to the switching signal applied to the first switch 167 of the first half bridge 163. A second switching time curve 213 corresponds to the switching signal applied to the first switch 167 of the second half bridge 164. A third switching time curve 214 corresponds to the switching signal applied to the first switch 167 of the third half bridge 165. A fourth switching time curve 215 corresponds to the switching signal applied to the first switch 167 of the fourth half bridge 166. The switching signal applied to the second switch 168 of the respective half bridge 150 is in each case exactly opposite to the switching signal applied to the first switch 167 of the respective half bridge 150, so that either the first switch 167 or the second switch 168 of each half bridge 150 is always closed, and at the same time the second switch 168 or the first switch 167 is open.

The level of the first switching time curve 212, the second switching time curve 213, the third switching time curve 214 and the fourth switching time curve 215 may be set with the aid of pulse-width modulation, wherein a higher signal in the first switching time curve 212, in the second switching time curve 213, in the third switching time curve 214 or in the fourth switching time curve 215 in each case corresponds to a larger pulse width in the pulse-width modulation.

In the classic three-phase system 114, the actuation of which is thus in FIGS. 10A and 10B, the voltages to be applied are so out of phase that limiting is not absolutely necessary. Furthermore, it may be seen from the first switching time curve 212 and the fourth switching time curve 215, which are identical, that the actuation via the actuation element 140 shown in FIG. 5 also functions if the fourth half bridge 166 is omitted and the third drive coil 113 (of FIG. 9) is also connected to the first half bridge 163.

If the switches 154 are switched as described, then voltages are applied to the drive coils 110, the curve of which is identical to the respective voltages to be applied.

Figure 11A:
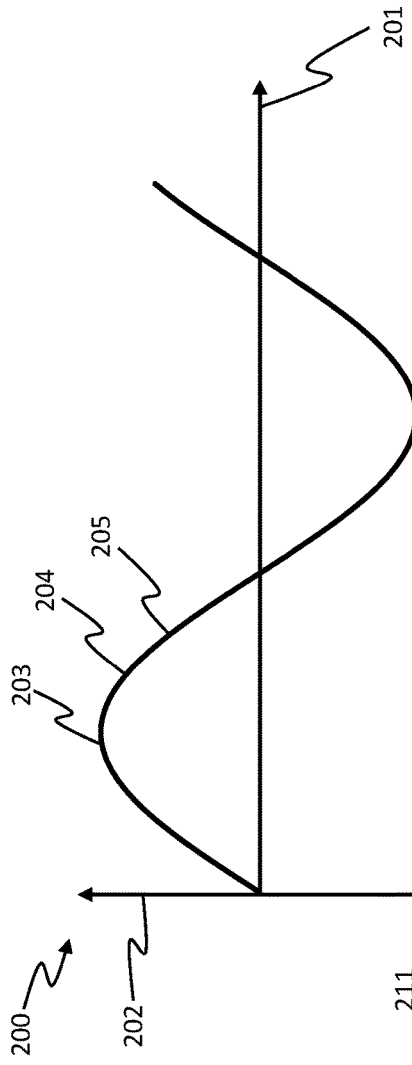
FIGS. 11A, 11B and 11C show actuation of the drive coils with necessary limitation.

FIG. 11A also shows a first diagram 200 in which voltage curves to be applied are shown for the voltages applied to the drive coils 110. The first diagram 200 has a time axis 201 and a voltage axis 202. A first voltage curve 203 to be applied corresponds to the voltage to be applied to the first drive coil 111. A second voltage curve 204 to be applied corresponds to the voltage to be applied to the second drive coil 112. A third voltage curve 205 to be applied corresponds to the voltage to be applied to the third drive coil 113. The first, second or third voltage curves 203, 204, 205, respectively, are each sinusoidal and their phase is identical.

Figure 11B:
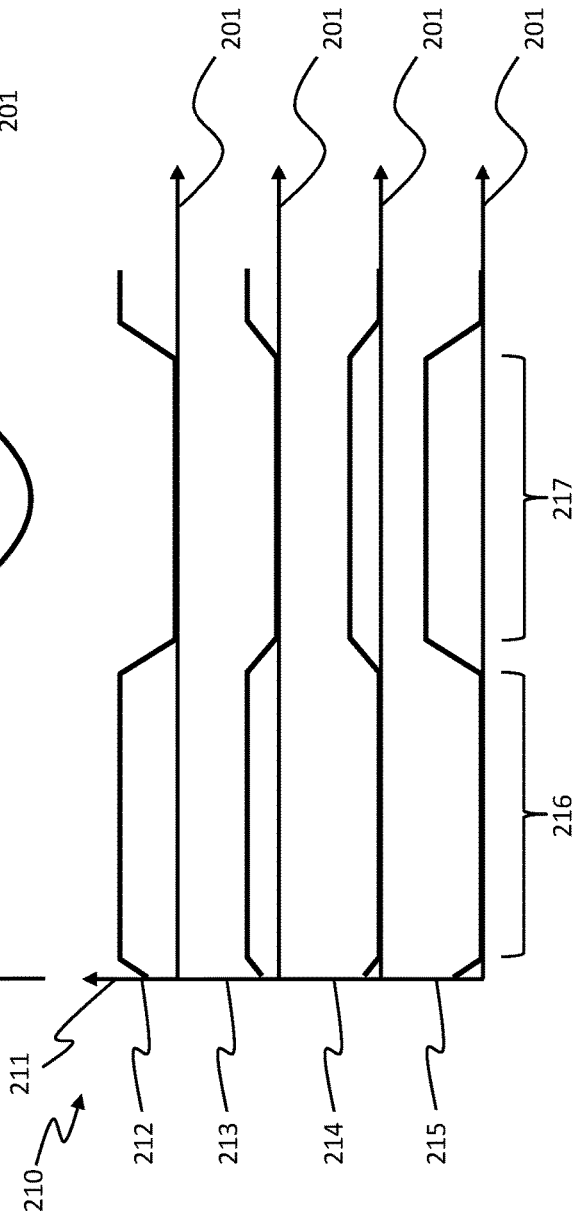

FIG. 11B further shows a second diagram 210 in which switching time curves of the switching signals applied to the first switches 167 of the half bridges 150 of FIG. 9 are shown. The diagram also comprises a time axis 201 and a signal axis 211. A first switching time curve 212 corresponds to the switching signal applied to the first switch 167 of the first half bridge 163. A second switching time curve 213 corresponds to the switching signal applied to the first switch 167 of the second half bridge 164. A third switching time curve 214 corresponds to the switching signal applied to the first switch 167 of the third half bridge 165. A fourth switching time curve 215 corresponds to the switching signal applied to the first switch 167 of the fourth half bridge 166. The switching signal applied to the second switch 168 of the respective half bridge 150 is in each case exactly opposite to the switching signal applied to the first switch 167 of the respective half bridge 150, so that either the first switch 167 or the second switch 168 of each half bridge 150 is always closed, and at the same time the second switch 168 or the first switch 167 is open.

Here, the level of the first switching time curve 212 is largest in a first region 216 of the time axis 201, and the level of the second switching time curve 213 is less than that of the first switching time curve 212 in the first region 216. The third switching time curve 214 and the fourth switching time curve 215 are each zero in the first region. In a second region 217 of the time axis 201, the first switching time curve 212 and the second switching time curve 213 are each zero, while the fourth switching time curve 215 is largest and the third switching time curve 214 is smaller than the fourth switching time curve 215.

The level of the first switching time curve 212, the second switching time curve 213, the third switching time curve 214 and the fourth switching time curve 215 may be set with the aid of pulse-width modulation, wherein a higher signal in the first switching time curve 212, in the second switching time curve 213, in the third switching time curve 214 or in the fourth switching time curve 215 in each case corresponds to a larger pulse width in the pulse-width modulation.

In the first region 216 and in the second region 217, the first switching time curve 212, the second switching time curve 213, the third switching time curve 214 and the fourth switching time curve 215 each have a plateau. In the areas of the plateaus, a larger voltage should actually be applied to the drive coils 110, but due to the voltage applied via the first voltage input 143 and the second voltage input 144, the maximum voltage has been limited by a limiting controller.

Figure 11C:
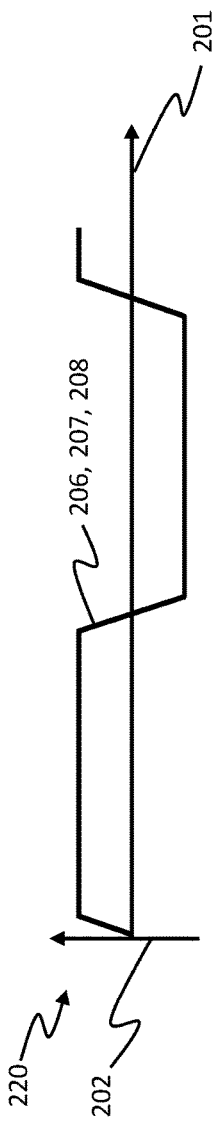

FIG. 11C further shows a third diagram 220 in which a voltage axis 202 is plotted over a time axis 201 and in which a first resulting voltage curve 206, a second resulting voltage curve 207, and a third resulting voltage curve 208 are shown. Due to the intervention of the limiting controller, the first resulting voltage curve 206, the second resulting voltage curve 207, and the third resulting voltage curve 208 are each also capped.

Figure 12A:
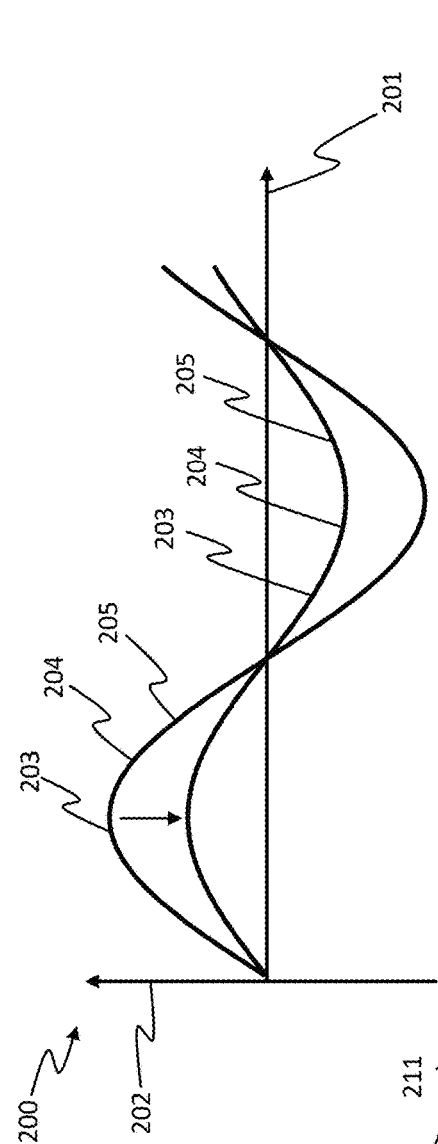
FIGS. 12A, 12B and 12C show adjustment of setpoints when limitation is necessary.

FIG. 12A also shows a first diagram 200 in which voltage curves to be applied are shown for the voltages applied to the drive coils 110. The first diagram 200 has a time axis 201 and a voltage axis 202. A first voltage curve 203 to be applied corresponds to the voltage to be applied to the first drive coil 111. A second voltage curve 204 to be applied corresponds to the voltage to be applied to the second drive coil 112. A third voltage curve 205 to be applied corresponds to the voltage to be applied to the third drive coil 113. The first, second and third voltage curves 203, 204, 205, respectively, are each sinusoidal and their phase is identical. Due to the limitation described in connection with FIGS. 11A-11C, it is provided in FIGS. 12A-12C to reduce the amplitude of the voltage curves 203, 204, 205. This is symbolized by an arrow in the first diagram 200.

Figure 12B:
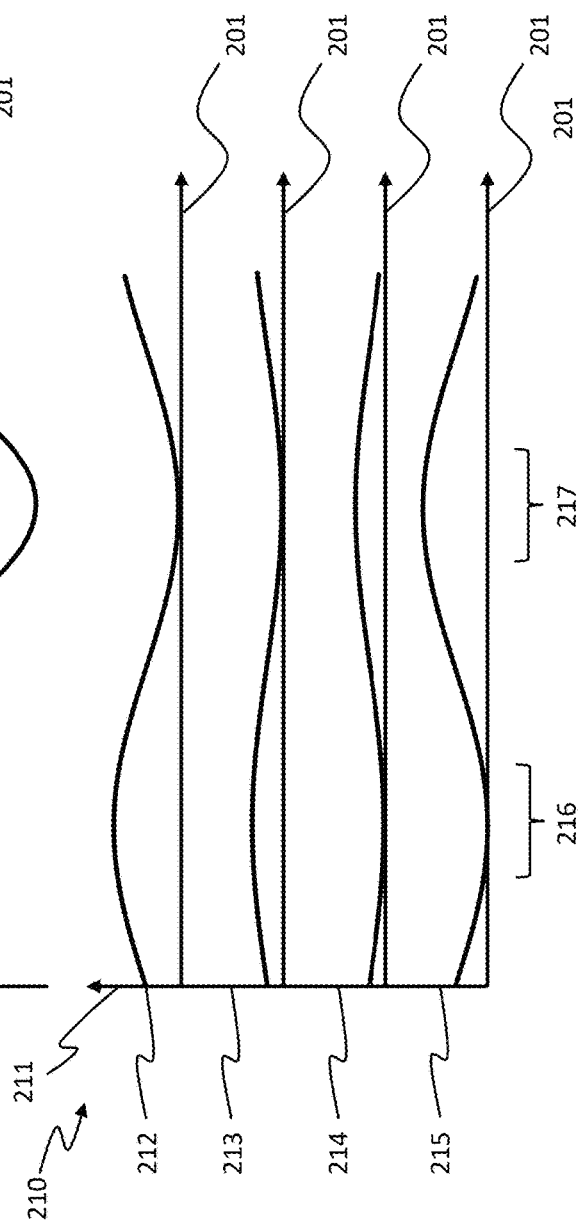

FIG. 12B further shows a second diagram 210, in which switching time curves of the switching signals applied to the first switches 167 of the half bridges 150 of FIG. 9 are shown. The diagram additionally comprises a time axis 201 and a signal axis 211. A first switching time curve 212 corresponds to the switching signal applied to the first switch 167 of the first half bridge 163. A second switching time curve 213 corresponds to the switching signal applied to the first switch 167 of the second half bridge 164. A third switching time curve 214 corresponds to the switching signal applied to the first switch 167 of the third half bridge 165. A fourth switching time curve 215 corresponds to the switching signal applied to the first switch 167 of the fourth half bridge 166. The switching signal applied to the second switch 168 of the respective half bridge 150 is in each case exactly opposite to the switching signal applied to the first switch 167 of the respective half bridge 150, so that either the first switch 167 or the second switch 168 of each half bridge 150 is always closed, and at the same time the second switch 168 or the first switch 167 is open.

Due to the limitation, the first switching time curve 212, the second switching time curve 213, the third switching time curve 214, and the fourth switching time curve 215 now no longer have a plateau. The level of the first switching time curve 212 is largest in a first region 216 of the time axis 201, and the level of the second switching time curve 213 is less than that of the first switching time curve 212 in the first region 216. The third switching time curve 214 and the fourth switching time curve 215 are each zero in the first region. In a second region 217 of the time axis 201, the first switching time curve 212 and the second switching time curve 213 are each zero, while the fourth switching time curve 215 is largest and the third switching time curve 214 is smaller than the fourth switching time curve 215. The first switching time curve 212, the second switching time curve 213, the third switching time curve 214, and the fourth switching time curve 215 are each sinusoidal, wherein the statement that one of the switching time curves is zero in a region means that this switching time curve touches the time axis 201 there.

The level of the first switching time curve 212, the second switching time curve 213, the third switching time curve 214 and the fourth switching time curve 215 may be set via pulse-width modulation, wherein a higher signal in the first switching time curve 212, in the second switching time curve 213, in the third switching time curve 214 or in the fourth switching time curve 215 in each case corresponds to a larger pulse width in the pulse-width modulation.

Figure 12C:
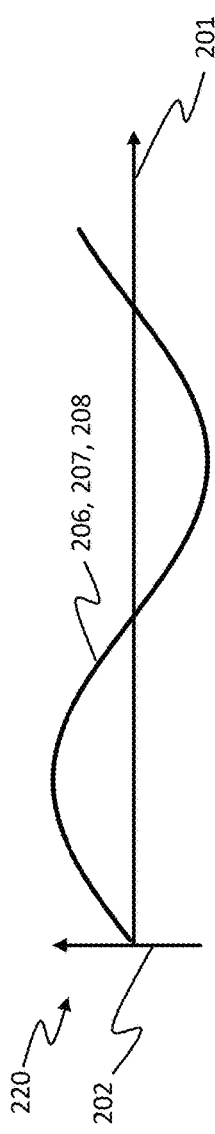

FIG. 12C also shows a third diagram 220 in which a voltage axis 202 is plotted over a time axis 201 and in which a first resulting voltage curve 206, a second resulting voltage curve 207, and a third resulting voltage curve 208 are shown. Due to the intervention of the limiting controller, the first resulting voltage curve 206, the second resulting voltage curve 207 and the third resulting voltage curve 208 now correspond to the first voltage curve 203 to be applied, the second voltage curve 204 to be applied and the third voltage curve 205 to be applied of the first diagram 200, respectively.

Figure 13:
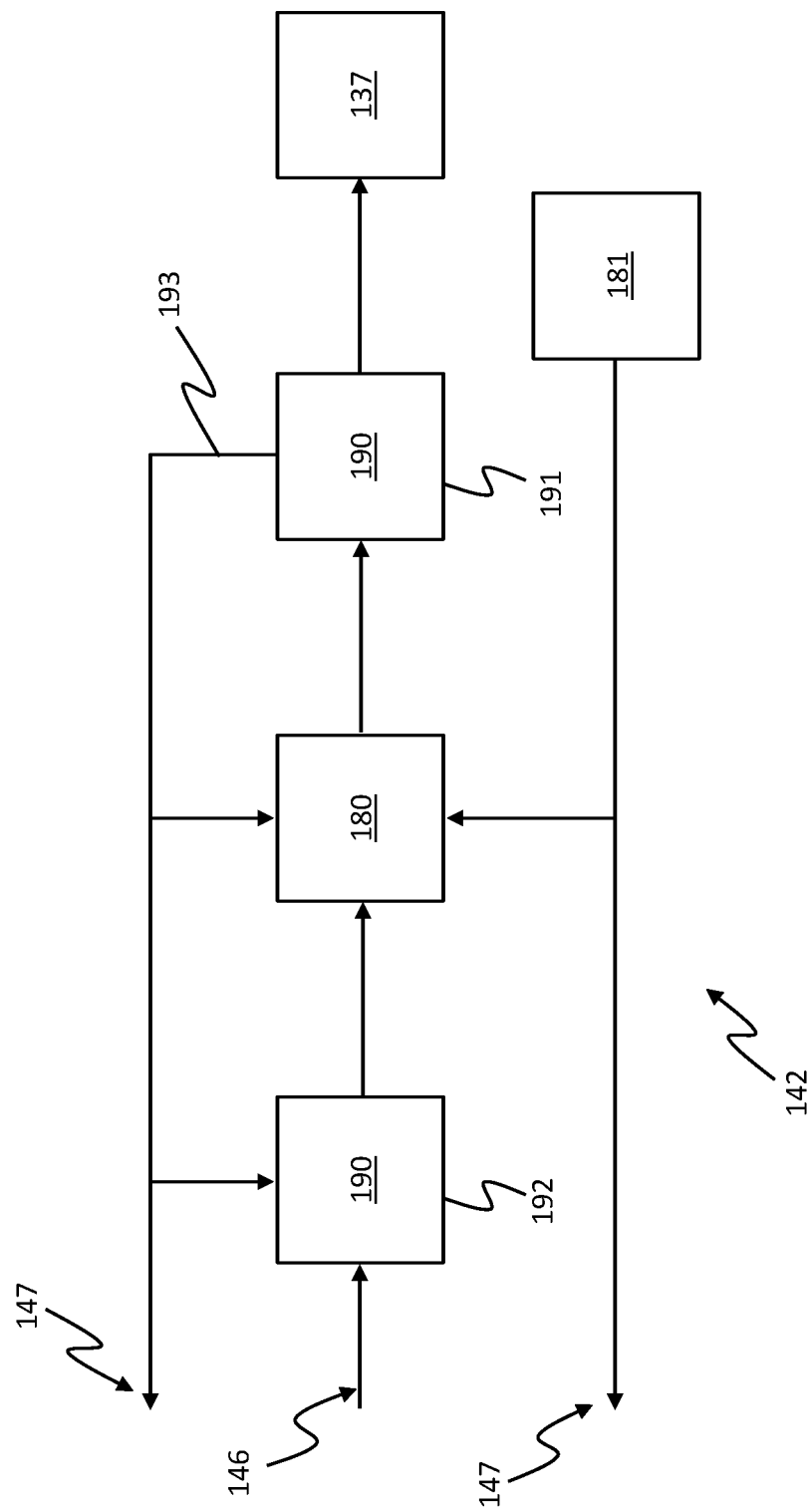
FIG. 13 shows a controller.

FIG. 13 shows a control 142 that is configured to perform the method described in connection with FIGS. 10 to 12. The control 142 comprises a control regulator 180 and current meters 181, which may be configured as described in connection with FIG. 7. In particular, the control regulator 180 may be a PI controller that is set up to determine and output a voltage value to be applied from a current setpoint or a voltage setpoint and an actual current value. The control 142 further comprises a control input 146, which may be connected to the communication input 171 of the stator module 100 and via which voltage or current setpoints may be read in. Via a modulation rule, a modulator 137 converts the voltage values to be applied into the first switching time curve 212, the second switching time curve 213, the third switching time curve 214 and the fourth switching time curve 215 as shown in FIGS. 10 to 12. If more or fewer half bridges 150 are provided, the number of switching time courses is increased or decreased accordingly.

A limiting controller 190 is arranged between the modulator 137 and the control regulator 180, which is embodied as a first limiting controller 191. The first limiting controller 191 is set up to change the current setpoints or voltage setpoints in such a way that a sum of voltages of the drive coils 110 of an actuation element 140 does not exceed a maximum voltage. This is done by capping the first switching time curve 212, the second switching time curve 213, the third switching time curve 214, and the fourth switching time curve 215 as described in connection with FIGS. 11A-11C, resulting in the capped first resulting voltage curve 206, the capped second resulting voltage curve 207, and the capped third resulting voltage curve 208.

A limiting controller 190 is arranged between the control input 146 and the control regulator 180, and is configured as a second limiting controller 192. The second limiting controller 192 is configured to reduce the voltage setpoints or current setpoints of the drive coils 110 as shown in the first diagram 200 of FIG. 12A.

The current meters 181 are connected to an optional control output 147. In this way, the actual current values may also be passed on to the controller 8. Furthermore, the first limiting controller 191 has an optional limiter output 193. This is connected to the control regulator 180, the second limiting controller 192 and also to a control output 147, all of these connections being optional. Via the limiter output 193, the first limiting controller 191 may output information that a limitation was required. This may e.g. be taken into account by the control regulator 180. Furthermore, the second limiting controller 192 may be set up to carry out the change in the voltage setpoints shown in the first diagram 200 of FIG. 12A only if the first limiting controller 191 has output a corresponding signal via the limiter output 193. Furthermore, provision may be made to output this signal via the control output 147 to the controller 8, which then carries out a change in the voltage setpoints or current setpoints corresponding to the operation of the second limiting controller 192.

Figure 14:
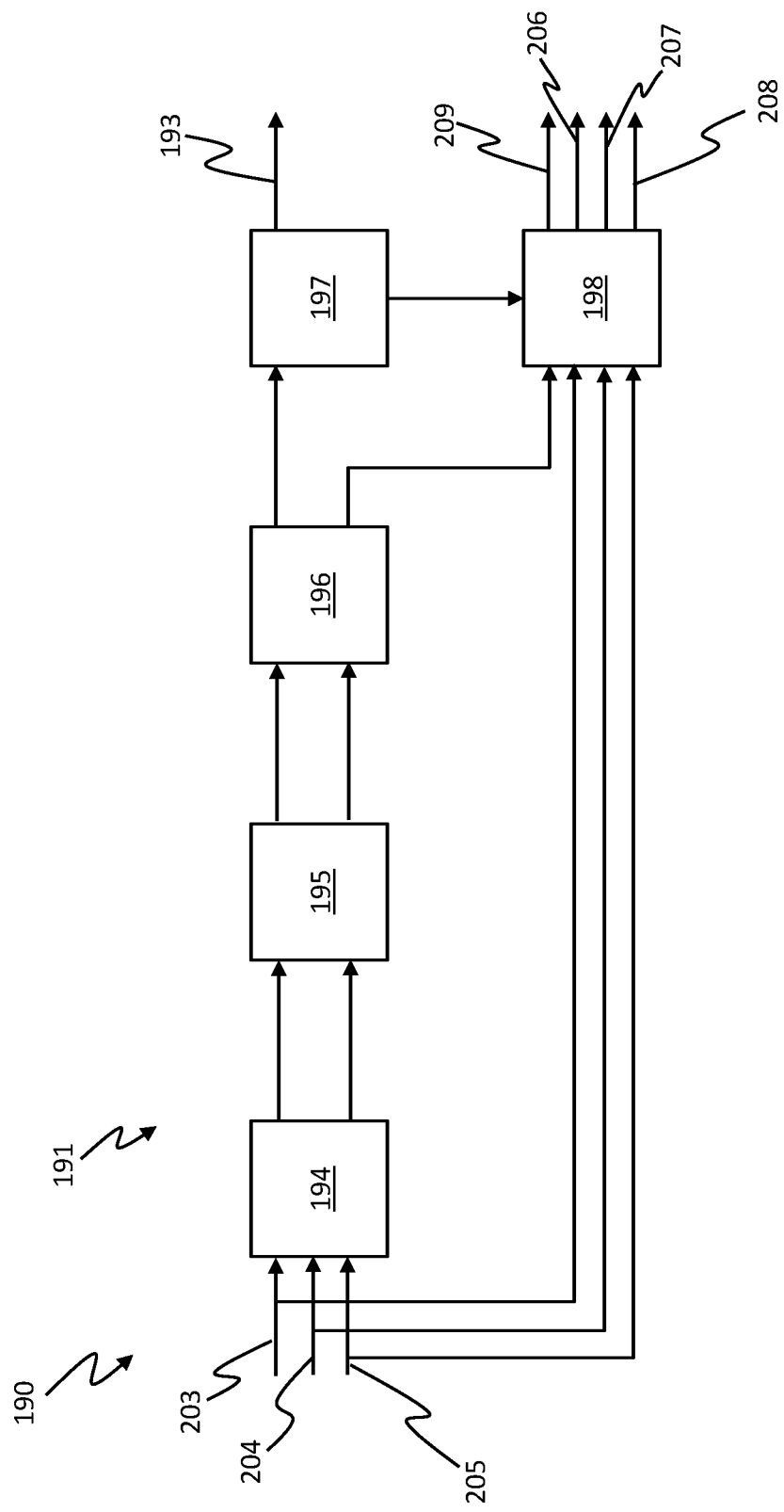
FIG. 14 shows a limiter.

FIG. 14 shows a functionality of a limiting controller 190, in particular of the first limiting controller 191 of FIG. 13. The first voltage curve 203 to be applied, the second voltage curve 204 to be applied and the third voltage curve 205 to be applied are made available as input to a summator 194. The summator 194 is arranged to calculate a cumulative sum over the first voltage curve 203 to be applied, the second voltage curve 204 to be applied, and the third voltage curve 205 to be applied, that is, a voltage curve over time of the voltage to be applied to the drive coils 110 of an actuation element 140. The cumulative sum is passed on to an extreme-value detector 195. The extreme-value detector 195 is arranged to determine a maximum value and a minimum value of the cumulative sum. The maximum value and the minimum value are passed on to a subtractor 196. The subtractor 196 is arranged to check whether a difference of the maximum value and the minimum value exceeds a design voltage. The difference is passed to a implementation table 197 and a regulating unit 198. In the implementation table 197, various action instructions may be selected based on the difference and passed to the regulating unit. For example, it may be stored in the implementation table 197 that in the event that the difference exceeds the design voltage, the voltage setpoints are to be reduced as described in connection with FIGS. 12A-12C or are to be capped as described in connection with FIGS. 11A-11C. In particular, the implementation table 197 may store that if the calculation steps are repeated, the difference should no longer exceed the design voltage. The implementation table 197 may further include outputting information that a limit has occurred via the limiter output.

The difference may alternatively be passed to a conversion computing unit in the form of an FPGA, which carries out the functions of the implementation table in the form of pre-programmed calculations.

In the regulating unit 198, the first voltage curve 203 to be applied, the second voltage curve 204 to be applied, and the third voltage curve 205 to be applied are then implemented based on the action instructions determined with the aid of the implementation table, and the first resulting voltage curve 206, the second resulting voltage curve 207, and the third resulting voltage curve 208, as well as modulation information 209, are output.

The calculation of the first resulting voltage curve 206, the second resulting voltage curve 207, and the third resulting voltage curve 208 may e.g. be carried out as described below. After forming the cumulative sum over the first voltage curve 203 to be applied, the second voltage curve 204 to be applied and the third voltage curve 205 to be applied and the maximum and minimum, respectively, of the cumulative sum, a quotient is formed from the design voltage and the difference. The first resulting voltage curve 206 is obtained by multiplying the first voltage curve 203 to be applied by the quotient, the second resulting voltage curve 207 is obtained by multiplying the second voltage curve 204 to be applied by the quotient, and the third resulting voltage curve 208 is obtained by multiplying the third voltage curve 205 to be applied by the quotient.

Figure 15:
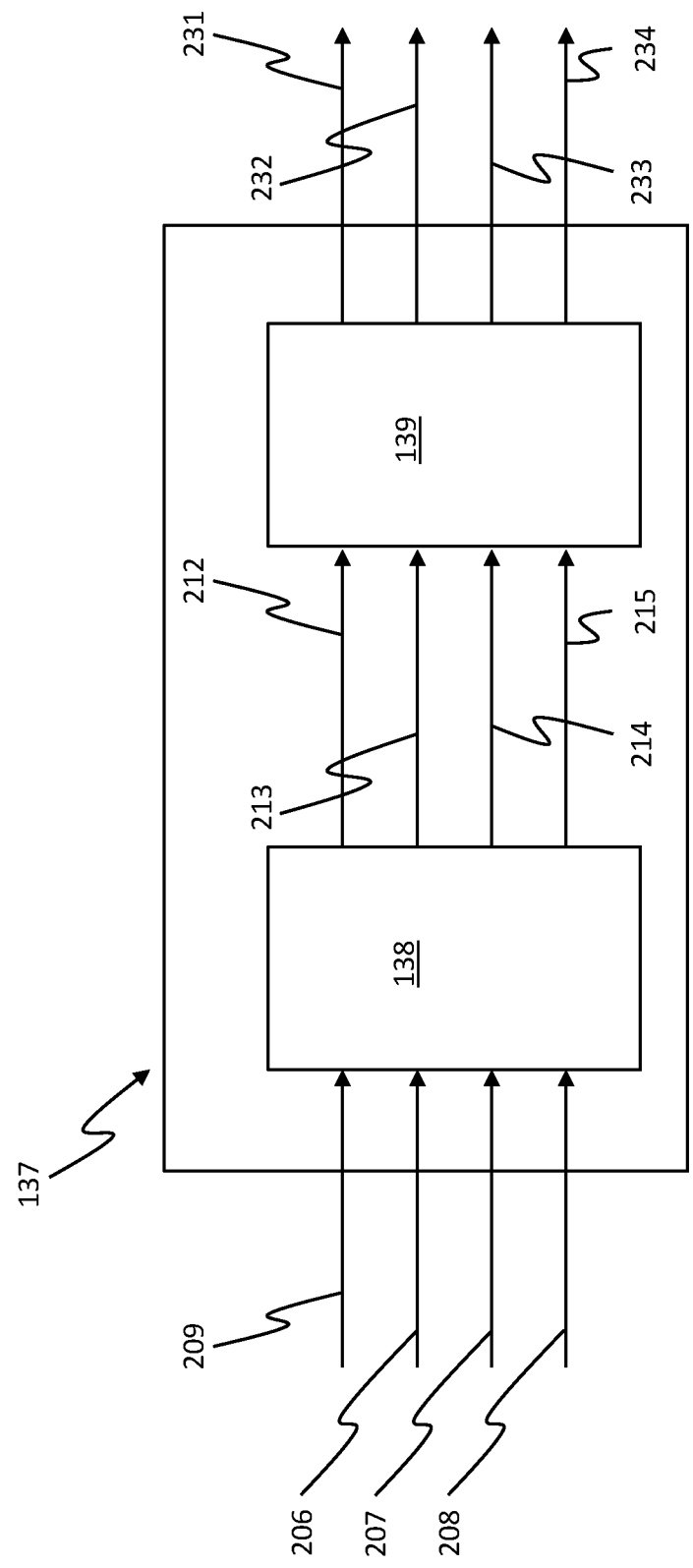
FIG. 15 shows a modulator.

FIG. 15 shows an operation of a modulator 137. A first resulting voltage curve 206, a second resulting voltage curve 207, and a third resulting voltage curve 208 as well as modulation information 209 are provided to a switching time calculation element 138 of the modulator 137. The modulator 137 converts these inputs into the first switching time curve 212, the second switching time curve 213, the third switching time curve 214, and the fourth switching time curve 215, as e.g. described in connection with FIGS. 10 to 12. The first switching time curve 212, the second switching time curve 213, the third switching time curve 214, and the fourth switching time curve 215 are then converted, in a pulse-width modulation element 139, into a first pulse-width signal 231, a second pulse-width signal 232, a third pulse-width signal 233, and a fourth pulse-width signal 234, each of which may be in the kHz range.

It may be provided that the steps described in connection with the control regulator 180 and the limiting controllers 190 are not carried out exclusively in the control 142, but entirely or partially in the controller 7 of the linear transport system 1. In particular, the control outputs 147 shown in FIG. 13 serve this purpose, in order to be able to pass corresponding data on to the controller 7. The limiter 9 shown in FIG. 1 as part of the controller 7 may be set up to carry out such steps and, in particular, to carry out the steps described in connection with the first limiting controller 191 and the second limiting controller 192.

TABLE 1

| | List of reference signs |
|---|---|
| 1 | Linear transport system |
| 7 | Controller |
| 8 | Communication output |
| 9 | Limiter |
| 10 | Slide |
| 11 | Frame |
| 12 | Roller |
| 13 | Permanent magnet assembly |
| 20 | Guide rail |
| 100 | Stator module |
| 101 | Housing |
| 110 | Drive coil |
| 111 | First drive coil |
| 112 | Second drive coil |
| 113 | Third drive coil |
| 114 | Three-phase system |
| 120 | Linear motor |
| 121 | Stator |
| 122 | Rotor |

TABLE 1-continued

| | List of reference signs |
|---|---|
| 130 | Actuation electronics |
| 137 | Modulator |
| 138 | Switching time calculation element |
| 139 | Pulse-width modulation element |
| 140 | Actuation element |
| 141 | Chain |
| 142 | Control |
| 143 | First voltage input |
| 144 | Second voltage input |
| 145 | Circuit board |
| 146 | Control input |
| 147 | Control output |
| 150 | Half bridge |
| 151 | First half-bridge connection |
| 152 | Second half-bridge connection |
| 153 | Half-bridge center |
| 154 | Switch |
| 155 | Switch input |
| 156 | Initial half bridge |
| 157 | Initial center |
| 158 | End half bridge |
| 159 | End center |
| 160 | Intermediate half bridge |
| 161 | Intermediate center |
| 163 | First half bridge |
| 164 | Second half bridge |
| 165 | Third half bridge |
| 166 | Fourth half bridge |
| 167 | First switch |
| 168 | Second switch |
| 170 | Module connection |
| 171 | Communication input |
| 180 | Control regulator |
| 181 | Current meter |
| 190 | Limiting controller |
| 191 | First limiting controller |
| 192 | Second limiting controller |
| 193 | Limiter output |
| 194 | Summator |
| 195 | Extreme-value detector |
| 196 | Subtractor |
| 197 | Implementation table |
| 198 | Regulating unit |
| 200 | First diagram |
| 201 | Timeline |
| 202 | Voltage axis |
| 203 | First voltage curve to be applied |
| 204 | Second voltage curve to be applied |
| 205 | Third voltage curve to be applied |
| 206 | First resulting voltage curve |
| 207 | Second resulting voltage curve |
| 208 | Third resulting voltage curve |
| 209 | Modulation information |
| 210 | Second diagram |
| 211 | Signal axis |
| 212 | First switching time history |
| 213 | Second switching time history |
| 214 | Third switching time history |
| 215 | Fourth switching time history |
| 216 | First area |
| 217 | Second area |
| 220 | Third diagram |
| 231 | First pulse-width signal |
| 232 | Second pulse-width signal |
| 233 | Third pulse-width signal |
| 234 | Fourth pulse-width signal |

The invention claimed is:

1. A stator module of a linear transport system, comprising:
a plurality of drive coils,
wherein the drive coils are energizable and form part of a stator of a linear motor,
wherein the stator module further comprises actuation electronics, wherein the drive coils are actuatable via the actuation electronics, wherein the actuation electronics comprise at least one actuation element, wherein the actuation element is configured to energize a number of drive coils, wherein the actuation element has a number of half bridges, wherein the half bridges each comprise a first half-bridge connection, a second half-bridge connection, and a half-bridge center, wherein the first half-bridge connections of the half bridges are connected to one another, wherein the second half-bridge connections of the half bridges are connected to one another, and wherein the half bridges and the drive coils form a chain, wherein half-bridge centers and drive coils are alternately arranged within the chain, wherein at least one half-bridge center is connected to two of said drive coils;

wherein the number of half bridges is identical to the number of drive coils.

2. The stator module according to claim 1,
wherein an initial center of an initial half bridge is connected to a first drive coil, wherein the first drive coil is connected to an intermediate center of an intermediate half bridge,
wherein the initial center of the initial half bridge is connected to a second drive coil, wherein the second drive coil is connected to an intermediate center of an intermediate half bridge, and
wherein third drive coils are connected to the intermediate half bridges and/or to further intermediate half bridges in accordance with the number of drive coils.

3. The stator module according to claim 1, wherein the number of drive coils equals three.

4. The stator module according to claim 3, wherein the three drive coils actuatable by the actuation unit form a three-phase system.

5. The stator module according claim 1, further comprising a communication input, wherein the stator module is arranged to receive data regarding the actuation of the drive coils via the communication input and to switch the half bridges of the actuation element according to the data.

6. The stator module according to claim 5, further comprising a control regulator, wherein the control regulator is configured to determine actual current values of the drive coils and to switch the half bridges of the actuation element based on the actual current values.

7. The stator module according to claim 6, further comprising current meters for determining the actual current values, wherein the current meters are arranged within the half bridges and/or in series with the drive coils.

8. The stator module according to claim 5, wherein the switching of the half bridges is carried out using pulse-width modulation.

9. The stator module according to claim 5, further comprising:
a limiting controller,
wherein the data comprises current setpoints or voltage setpoints for the drive coils,
wherein the limiting controller is configured to change the current setpoints or voltage setpoints, respectively, in such a way that a sum of voltages of the drive coils of an actuation element does not exceed a maximum voltage.

10. A stator module of a linear transport system, comprising:
a plurality of drive coils,
wherein the drive coils are energizable and form part of a stator of a linear motor,
wherein the stator module further comprises actuation electronics, wherein the drive coils are actuatable via the actuation electronics,
wherein the actuation electronics comprise at least one actuation element, wherein the actuation element is configured to energize a number of drive coils,
wherein the actuation element has a number of half bridges, wherein the half bridges each comprise a first half-bridge connection, a second half-bridge connection, and a half-bridge center,
wherein the first half-bridge connections of the half bridges are connected to one another,
wherein the second half-bridge connections of the half bridges are connected to one another, and
wherein the half bridges and the drive coils form a chain, wherein half-bridge centers and drive coils are alternately arranged within the chain, wherein at least one half-bridge center is connected to two of said drive coils;
further comprising a communication input,
wherein the stator module is arranged to receive data regarding the actuation of the drive coils via the communication input and to switch the half bridges of the actuation element according to the data; and
further comprising a limiting controller,
wherein the data comprises current setpoints or voltage setpoints for the drive coils, and
wherein the limiting controller is configured to change the current setpoints or voltage setpoints, respectively, in such a way that a sum of voltages of the drive coils of an actuation element does not exceed a maximum voltage;
wherein the limiting controller is further configured to:
calculate a cumulative sum of a time curve of the voltage to be applied to the drive coils of an actuation element,
determine a maximum value and a minimum value of the cumulative sum, and
check whether a difference of the maximum value and the minimum value exceeds a design voltage; and
in a case that the difference exceeds the design voltage, to reduce the voltage setpoints in such a manner that the difference no longer exceeds the design voltage when the calculation steps are repeated.

11. A linear transport system comprising:
at least one stator module, the stator module comprising:
a plurality of drive coils,
wherein the drive coils are energizable and form part of a stator of a linear motor,
wherein the stator module further comprises actuation electronics, wherein the drive coils are actuatable via the actuation electronics,
wherein the actuation electronics comprise at least one actuation element, wherein the actuation element is configured to energize a number of drive coils,
wherein the actuation element has a number of half bridges, wherein the half bridges each comprise a first half-bridge connection, a second half-bridge connection, and a half-bridge center,
wherein the first half-bridge connections of the half bridges are connected to one another,
wherein the second half-bridge connections of the half bridges are connected to one another, and
wherein the half bridges and the drive coils form a chain, wherein half-bridge centers and drive coils are alternately arranged within the chain, wherein at least one half-bridge center is connected to two of said drive coils;
further comprising:
at least one slide, and
at least a controller,
wherein the controller is configured to forward data to a communication input of the stator module via a communication output, and
wherein the data comprises current setpoints or voltage setpoints for the drive coils of the stator module;
wherein the controller comprises a limiter, wherein the limiter is configured to change the current setpoints or voltage setpoints in such a way that a sum of voltages of the drive coils of an actuation element does not exceed a maximum voltage.

12. The linear transport system according to claim 11, wherein the limiter is configured to:
calculate a cumulative sum of a time curve of the voltage to be applied to the drive coils of an actuation element,
determine a maximum value and a minimum value of the cumulative sum, and
check whether a difference of the maximum value and the minimum value exceeds a design voltage; and
in a case that the difference exceeds the design voltage, to reduce the voltage setpoints in such a way that the difference no longer exceeds the design voltage when the calculation steps are repeated.

13. A method for operating a stator module of a linear transport system according to claim 1,
wherein drive coils of the stator module are actuated with the aid of half bridges, and
wherein the actuation of the half bridges takes into account that at least one half bridge is connected to two drive coils.

14. The method according to claim 13, wherein the stator module receives data comprising current setpoints or voltage setpoints for the drive coils, and changes the current setpoints or voltage setpoints in such a way that a sum of voltages of the drive coils of an actuation element does not exceed a maximum voltage.

15. The method according to claim 14, wherein the stator module:
calculates a cumulative sum of a time curve of the voltage to be applied to the drive coils of an actuation element,
determines a maximum value and a minimum value of the cumulative sum, and
checks whether a difference from the maximum value and the minimum value exceeds a design voltage; and
in a case that the difference exceeds the design voltage, reduces the voltage setpoints in such a way that when the calculation steps are repeated, the difference no longer exceeds the design voltage.

* * * * *